United States Patent
Salazar

(10) Patent No.: US 7,222,699 B2
(45) Date of Patent: May 29, 2007

(54) BRAKE LINING WEAR VISUAL INDICATOR FOR CAM ACTUATED BRAKES

(76) Inventor: Joe Martin Salazar, 8738 E. Highway 103, Lufkin, TX (US) 75901

(*) Notice: Subject to any disclaimer, the term of this patent is extended or adjusted under 35 U.S.C. 154(b) by 33 days.

(21) Appl. No.: 11/233,984

(22) Filed: Sep. 23, 2005

(65) Prior Publication Data

US 2006/0076195 A1    Apr. 13, 2006

Related U.S. Application Data

(60) Provisional application No. 60/616,874, filed on Oct. 8, 2004.

(51) Int. Cl.
*F16D 66/02* (2006.01)

(52) U.S. Cl. .................. 188/1.11 W; 188/72.9

(58) Field of Classification Search .......... 188/1.11 R, 188/1.11 W, 72.9, 1.11 E
See application file for complete search history.

(56) References Cited

U.S. PATENT DOCUMENTS

| | | | | |
|---|---|---|---|---|
| 5,320,198 A | * | 6/1994 | Hoyt et al. | 188/1.11 W |
| 5,441,128 A | * | 8/1995 | Hoyt | 188/1.11 W |
| 5,535,854 A | * | 7/1996 | Prince | 188/1.11 R |
| 5,762,165 A | * | 6/1998 | Crewson | 188/1.11 W |
| 6,059,074 A | * | 5/2000 | Crewson | 188/1.11 W |
| 6,390,244 B1 | * | 5/2002 | Sitter | 188/1.11 W |

* cited by examiner

*Primary Examiner*—Devon Kramer
(74) *Attorney, Agent, or Firm*—Donald W. Meeker

(57) ABSTRACT

A multicolored indicator part and cover part are attached to a truck brake slack adjuster and S cam shaft. Relative motion of the brake slack adjuster and the S cam shaft causes relative motion of the two parts to reveal the colors on the indicator part. Good, warning, and danger colors are provided in highly reflective surfaces seen in a walk around inspection of a truck.

7 Claims, 4 Drawing Sheets

BRAKE LINING WEAR VISUAL INDICATOR FOR CAM ACTUATED BRAKES

CLAIM OF PROVISIONAL APPLICATION RIGHTS

This application claims the benefit of U.S. Provisional Patent Application No. 60/616,874, filed on Oct. 8, 2004.

BACKGROUND OF THE INVENTION

1. Field of the Invention

The present invention relates to braking system wear indicators and particularly to a brake lining wear indicator for an "S" cam type truck brake wherein an indicator is mounted on the slack adjuster lever arm and S cam shaft, which gives visual reference to the condition of the brake lining.

2. Description of the Prior Art

Most air braking systems for trucks have drum-type brakes with two arcuate shoe arms pivotally carried at first adjacent ends inside a brake drum for expansion against the inner surface of the drum to cause frictional braking action. The shoe arms are expanded by an "S" cam that is rotated between second adjacent ends of the opposed arms to cause both shoe arms to move radially outwardly in substantially similar fashion. A diaphragm type canister is normally provided that applies motive force to an actuator arm or lever which can include a slack adjuster mechanism that in turn rotates the "S" cam shaft for braking. A valve operated by the vehicle brake pedal releases compressed air to the canister to move the diaphragm. This system gives little, if any indication of brake wear condition to an operator.

Prior art devices do not provide indicators for brake wear which provide accurate visual wear indicators that can easily be viewed in a normal truck walk around inspection.

U.S. Pat. No. 5,320,198 issued Jun. 14, 1994 to Hoyt, is for an indicator for indicating the setting and linear stroke movement of a brake rod of a brake assembly. The gage includes reference indicators that are located on both the brake rod's clevis and on the arm of the brake's slack adjustment member, thereby indicating the brake rod travel and the need for brake adjustment.

U.S. Pat. No. 5,535,854, issued Jul. 16, 1996 to Prince, provides a one piece brake lining wear indicator gauge which is a reversible circular dial. Calibration marks are included on both sides of the circular dial along with several accentuating notches on the outside circumference of the dial. When the dial is coupled to the splined end of a rotatable brake shoe camshaft equipped with manual or automatic slack adjusting levers, the dial acts as an indicator of the amount of brake lining wear that occurs inside the brake drum compartment.

U.S. Pat. No. 6,390,244, issued May 21, 2002 to Sitter, shows a brake wear indicator that provides visual and tactile indication of unacceptable brake wear. The brake wear indicator has a hub drive attached to a cam shaft, a brake wear disk attached to the hub drive and a body attached to a slack adjuster lever. The brake wear disk has a wear detector lug. The body has two the travel limit lugs which extend towards the centerline of the brake wear disk and are on the end of flexible fingers. When the brake linings are approaching unacceptable wear, the wear detector lug contacts one of the travel limit lugs and pushes the travel limit lug and the end of the corresponding finger away from the adjacent outer surface of the body. The rising of the end of the finger above the adjacent surface provides visual and tactile indication of unacceptable brake wear.

U.S. Pat. No. 3,356,188, issued Dec. 5, 1967 to Goldman, claims a brake lining wear indicator that comprises a dial and an indicating plate. The dial attaches to the S-Cam shaft and the indicating plate attaches to the slack adjuster lever. When new brake linings are installed and the brakes are properly adjusted a central lip on the dial corresponds with a tang on the indicating plate. As the brakes wear and the slack adjuster is adjusted the dial rotates with respect to the indicating plate. When the brake linings are completely worn and the brakes are properly adjusted, the tang corresponds with one of two lips on the dial.

U.S. Pat. No. 5,358,076, issued Oct. 25, 1994 to Lucas, describes an indicator unit for a vehicle air brake system which includes a brake rod mounted for movement between a non-braking first position and a predetermined safe maximum braking second position. A pivotally mounted slack adjuster is connected to the brake rod and is responsive to the movement of the rod. An indicator unit is provided which has a first section removably mounted on the connection between the rod and adjuster, a second section retained in a predetermined alignment with the rod, and a third section angularly disposed relative to the second section. The unit third section is provided with angularly disposed, exposed, first and second reference marks. When the rod is in the first position, the first reference mark is aligned with a predetermined first segment of the adjuster. When the rod is in the second position, the second reference mark is aligned with the predetermined segment of the adjuster. The alignment of the second reference mark with the adjuster segment is indicative that the rod has traversed 80%, or the limit, of its safe braking stroke and thus indicates adjustment of the brake system is warranted.

U.S. Pat. No. 2,379,796, issued Jul. 3, 1945 to Freeman, discloses a brake operating mechanism having a cam operating shaft with an operating arm mounted thereon, said shaft further having a pointer and a scale thereon for indicating the adjusted position of the cam.

U.S. Pat. No. 2,522,903, issued Sep. 19, 1950 to Shively, indicates a brake operating and adjusting mechanism having a cam shaft with an anchor arm and a cap mounted thereon, both of which have indicating marks that cooperate to show how much take up has been made from the initial position on the cam shaft.

U.S. Pat. No. 6,059,074, issued May 9, 2000 to Crewson, is for a gauge for visually indicating travel of a brake operating rod having one end pivotally connected to a slack adjuster including a plate bearing indicia, which is mounted for movement with the one end of the brake operating rod, and a pointer pivotally supported on the slack adjuster and arranged to point to the indicia, wherein the pointer is coupled to the plate to cause the pointer to pivot relative to the adjuster and swing relative to the indicia, during travel of the brake operating rod.

U.S. Pat. No. 5,762,165, issued Jun. 9,1998 to Crewson, shows indicia applied to opposite side surfaces of a housing of a slack adjuster for vehicle brakes and a pointer is fixed for movement with a connector serving to pivotally connect the housing to a brake operating rod; the pointer cooperating with the indicia to provide visual indication of when the brake operating rod is in a retracted brake release position and when movement of such operating rod away from the brake release position exceeds a desired limit of brake operating movement.

U.S. Pat. No. 5,441,128, issued Aug. 15, 1995 to Hoyt, provides a bracket body which is easily affixed to the brake rod and clevis member of conventional brake adjustment apparatus of air-actuated braking mechanism, and provides indirect measurement of brake rod travel and adjustment, by the body showing the amount of angular rotation of the brake's adjuster member, even though brake rod travel is a generally linear stroke movement. The bracket body has a central body portion from which extends two extension members, a first one of the extension members being provided with attachment for the clevis and brake rod assembly, and the central body portion with attachment to the clevis pin. The second extension member provides the visual reference by relevance to the adjuster member.

What is needed is a visual indicator device showing brake lining condition which is highly visible to a driver in a simple walk around inspection of the truck without climbing under the truck.

SUMMARY OF THE INVENTION

An object of the present invention is to provide a color coded visual brake wear indicator device showing brake lining condition including a warning indicator which is highly visible to a driver in a simple walk around inspection of the truck without climbing under the truck to make the driver aware of the condition of the brake linings so that action may be taken in time to save a brake failure and also save scarring of the brake drum from worn out linings, which is an expensive repair.

A related object of the present invention is to provide a color coded visual indicator device which also indicates worn brake hardware.

Another object of the present invention is to provide a brake condition indicator which is easy to install in a few minutes.

One more object of the present invention is to provide a brake condition indicator which is relatively simple in construction and rugged enough to withstand the harsh conditions adjacent to the truck tires and operate effectively.

An additional object of the present invention is to provide a simple two part brake condition indicator mechanism which is relatively inexpensive to manufacture.

A further object of the present invention is to provide a brake condition indicator device which does not interfere with the operation of the brakes.

Yet another object of the present invention is to provide an additional triggering device on the "S" camshaft to send an electric signal to light up an indicating brake wear light on the instrument panel of the truck when a predetermined amount of brake wear occurs.

Still one more object of the present invention is to fabricate the brake condition indicator of high quality aluminum so that it does not deteriorate, wear, fade or chip and can be used over again with minor adjustments.

In brief, the present invention is used on slack adjusters on cam actuated brakes to show the progressive degree of brake lining wear. As the brake linings wear out, the "S" camshaft turns by means of the slack adjuster, which maintains the proper push rod travel. The center splines of the slack adjuster are turned manually or automatically, if properly equipped, to maintain proper slack adjuster stroke.

The present invention has two primary parts:
1. A multi-colored indicator part preferably comprising a green safe brake liner indicator surface, a yellow brake liner indicator surface to warn of thin break linings, and a red danger brake liner indicator surface warning of possible metal on metal with no brake lining, and
2. An opaque cover part which initially conceals at least a portion of the multi-colored indicator part, the opaque cover part positioned over the multi-colored indicator part, so that as one part moves relative to the other due to adjustment of wearing down of the brake lining, the colors of the indicator part become exposed to reveal an initial safe indicator portion and then a warning indicator portion, and finally a danger warning indicator portion.

The two part indicator of the present invention has one part attached to the slack adjuster and one part to the S cam shaft, so that as the slack adjuster and S cam shaft go through relative movement in adjusting for the thickness reduction of the brake lining due to wear, the opaque cover part and color indicator part move relative to each other to reveal the indicator color showing the current wear level of the brake lining.

The present invention preferably comprises a piece of pie shaped color coded (preferably green, yellow, and red) indicator part and mating piece of pie shaped cover part. The green color represents the total brake thickness in degrees. The yellow represents the degrees of brake lining that are in the warning zone before metal to metal contact is reached. Red represents a very high possibility of metal to metal contact.

The key in using the present invention is to check and replace the brakes when the bright yellow color starts to show and not wait until the red zone appears indicating worn out brakes with very possible metal to metal contact. Once the bright yellow starts to show there is approximately ⅛ inch of good lining before reaching the maximum wear allowed. This gives the driver sufficient time to schedule the vehicle for service without the danger of driving with worn out brakes. The bad condition indicator zone could also indicate worn brake hardware.

An advantage of the present invention is that it provides a brake lining condition indicator and brake wear warning which is highly visible to a driver day or night in a simple walk around inspection of the truck without climbing under the truck and it takes the guess work out of the brakes.

A related advantage of the present invention is that it also indicates worn brake hardware.

Another advantage of the present invention is that it is easy to install in a few minutes, normally less than ten minutes.

One more advantage of the present invention is that it is relatively simple in construction and rugged enough to withstand the harsh conditions adjacent to the truck tires and operate effectively.

An additional advantage of the present invention is that it is relatively inexpensive to manufacture.

A further advantage of the present invention is that it does not interfere with the operation of the brakes and does not jeopardize or affect the function of the existing brake system including ABS systems in any way.

Yet another advantage of the present invention is that it lights up an indicating brake wear light on the instrument panel of the truck when a predetermined amount of brake wear occurs.

Still another advantage of the present invention is that it makes it easy to compare brake lining wear from one wheel to another to assure even braking.

An additional advantage of the present invention is that it alerts a driver when brakes need replacing and provides enough time to schedule brake service and thus avoiding unnecessary brake expense and down time.

A corollary advantage of the present invention as that it enables a driver to diagnose brake problems, because if it shows that there is too much brake wear variation between wheels, this can indicate possible brake hardware failure.

Still one more advantage of the present invention is that it is made of high quality aluminum and does not deteriorate, wear, fade or chip and can be used over again with minor adjustments.

One additional advantage of the present invention is that it will work on newer or older trucks and trailers with manual or automatic slack adjusters.

Yet one more advantage of the present invention is that it aids technicians in diagnosing brake problems and P.M. inspections.

A final advantage of the present invention is that it has a proven accuracy of 85–90 percent on indicating actual brake lining wear.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

Figure 1:
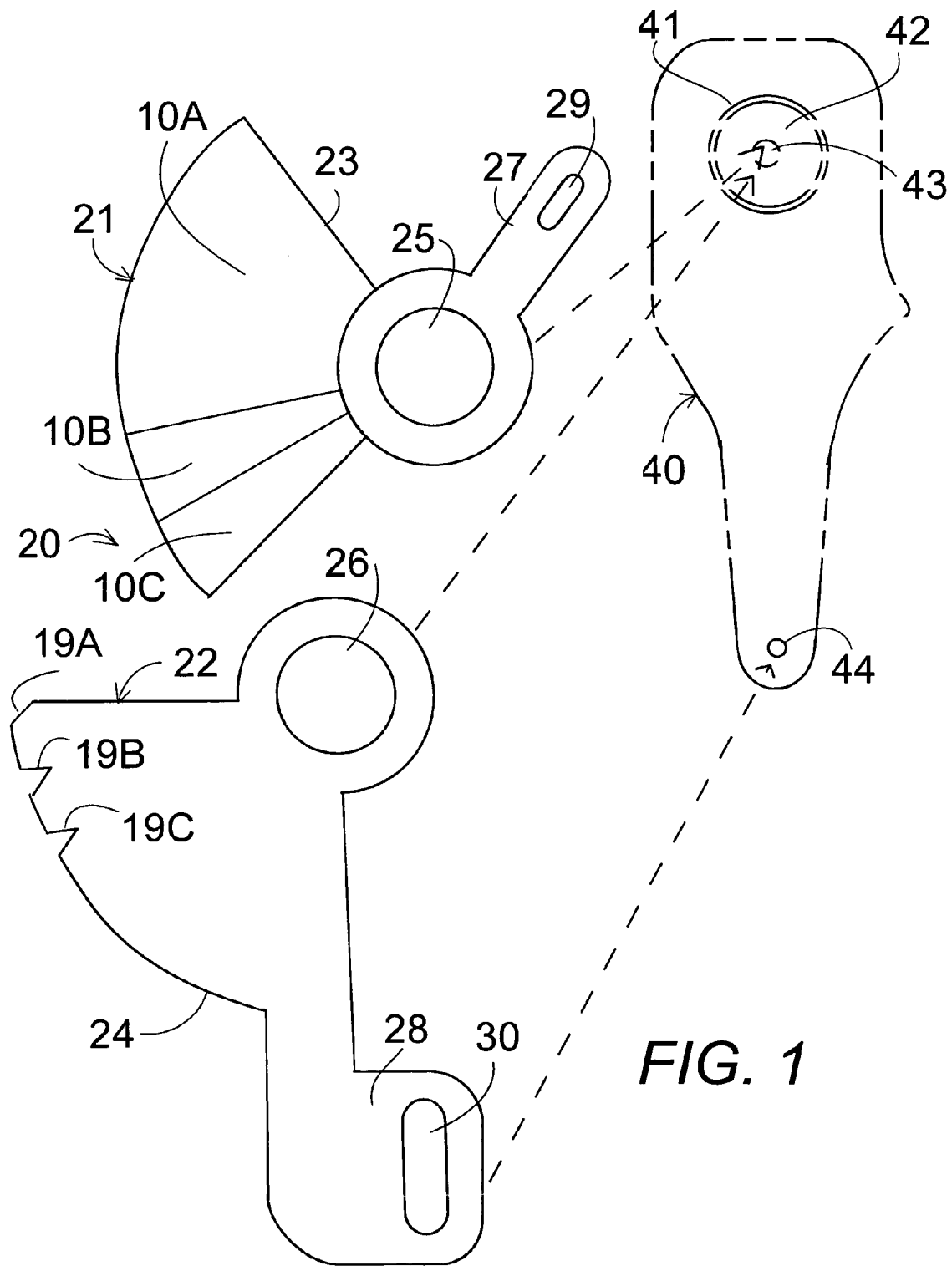
FIG. 1 is a schematic exploded elevational view showing the visual indicator part and the cover part of the preferred embodiment of the invention and arrows showing where each part attaches to a slack adjuster and S cam shaft of a truck brake.

In FIGS. 1–4, a two-part color-coded brake condition visual indicator device 20 and 20A for trucks comprises a visual indicator part 21 and 21A with a circular opening 25 at a proximal end and an overlapping cover part 22 and 22A with a circular opening 26 and 26A at a proximal end, both circular openings encircling encircling an S cam shaft 47 of a truck having a brake slack adjuster 40 and an S cam shaft 47. One of the two parts is additionally attachable by a rigid attaching element to the slack adjuster 40 and the other of the two parts additionally attachable by a rigid attaching means to the S cam shaft 47, so that as the slack adjuster 40 and the S cam shaft 47 go through relative movement in adjusting for the thickness reduction of a brake lining due to wear, the cover part 22 and 22A and the visual indicator part 21 and 21A move relative to each other to reveal at least a portion of a multicolored visual indicator surface 23 showing a current wear level of the brake lining so that a first color 10A indicates a safe thickness of the brake lining and a second color 10B indicates a warning for an unsafe thickness of the brake lining. Preferably, an additional third color 10C indicates a dangerous condition with the brake lining fully worn.

Figure 3:
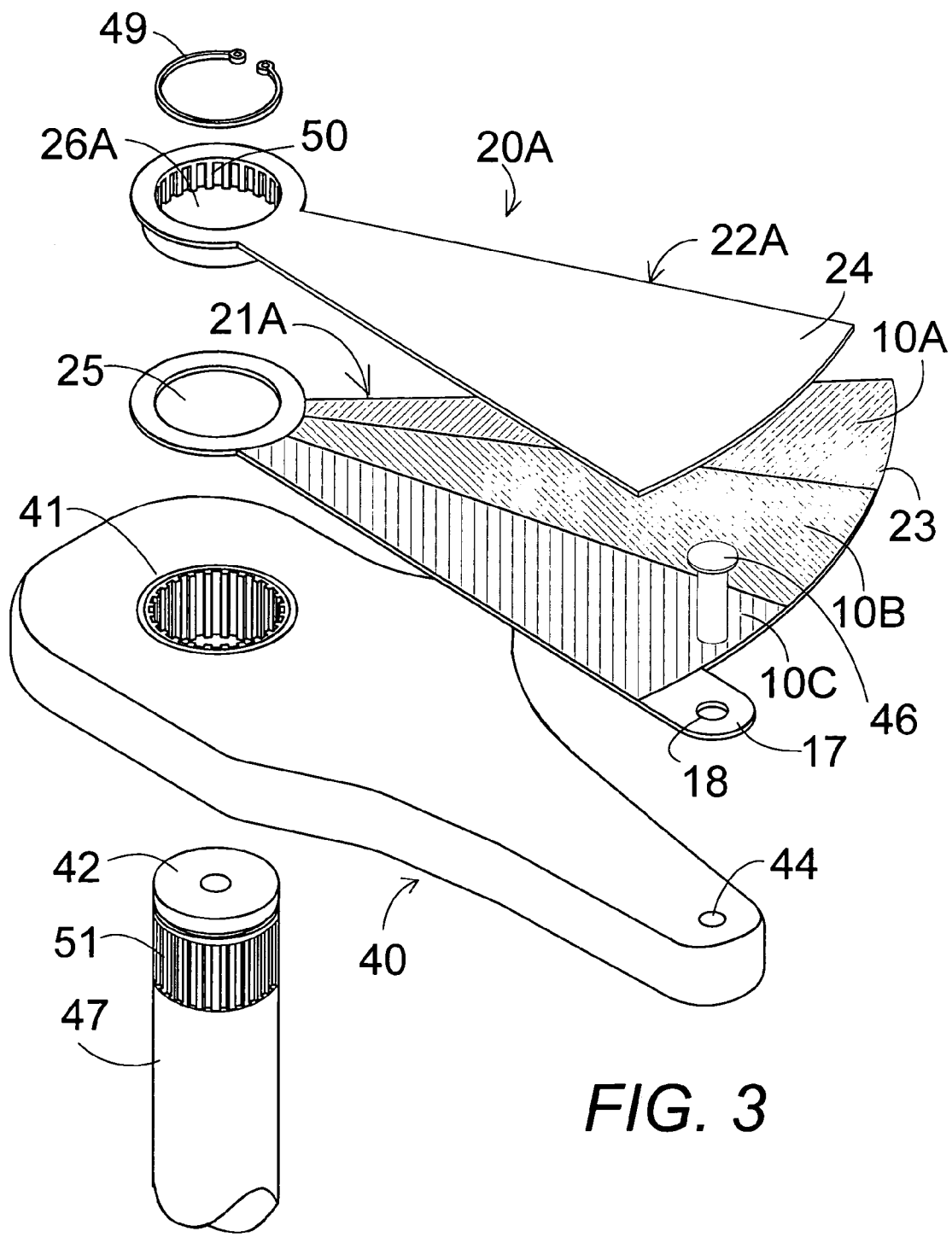
FIG. 3 is an exploded perspective view of an alternate embodiment of the invention showing the visual indicator part and the cover part of the preferred embodiment of the invention aligned for attachment to a slack adjuster and S cam shaft of a truck brake.

In FIGS. 1 and 3, the visual indicator part 21 and 21A comprising a flat tab having a multicolored visual indicator surface 23 on a side of a distal end of the flat tab. The multicolored visual indicator surface has a least two and preferably three different colors 10A, 10B, and 10C of highly luminous reflective tape attached to the tab, and an indicator part circular opening 25 in a proximal end of the flat tab for encircling an S cam shaft on each wheel of the truck at a flat end face 42 portion of the S cam shaft.

In FIGS. 1 and 3, the cover part 22 and 22A comprises a mating flat tab 24 having a distal end of the mating flat tab for covering at least a portion of the multi-colored visual indicator surface 23 of the visual indicator part 21 and 21A and a cover part circular opening 26 and 26A in a proximal end of the flat tab for encircling the S cam shaft 47 at a flat end face 42 portion of the S cam shaft on each wheel of the truck. The cover part 22 and 22A overlies the visual indicator part 21 and 21A to conceal at least a portion of the multicolored visual indicator surface 23 of the visual indicator part.

The visual indicator part flat tab 23 and the cover part mating flat tab 24 preferably comprise flat pie shaped elements.

The multicolored visual indicator surface 23 preferably comprises a green color portion 10A indicating a safe brake liner indicator surface, the green color portion proportional in size to the brake lining, a yellow color portion 10B brake liner indicator surface to warn of thin break linings, and a red color portion 10C indicating danger brake liner indicator surface warning of possible metal on metal with no brake lining.

Figure 2:
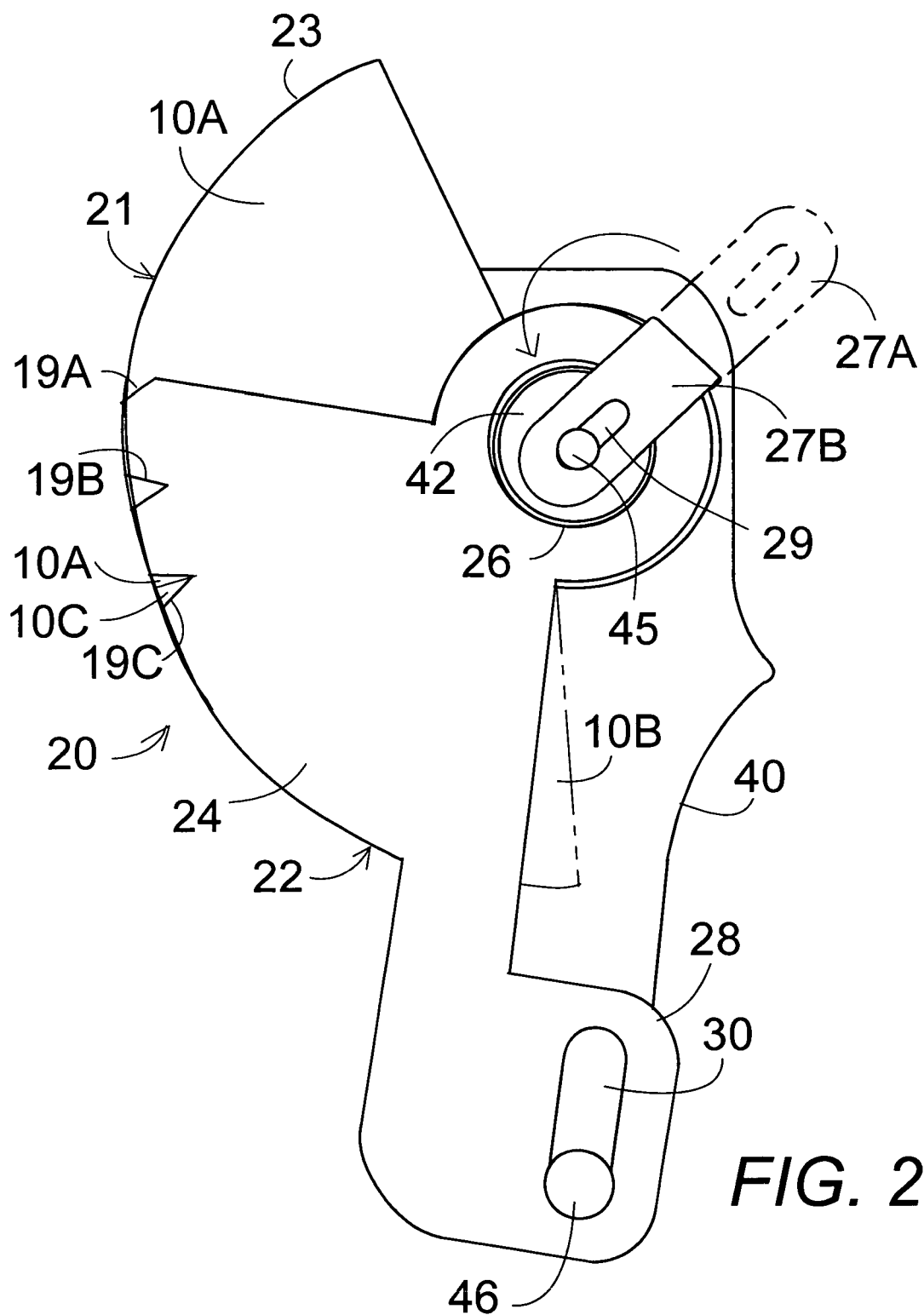
FIG. 2 is a schematic front elevational view showing the visual indicator part and the cover part of the preferred embodiment of FIG. 1 with both parts attached to a slack adjuster and S cam shaft of a truck brake.

In FIGS. 1 and 2 the preferred embodiment of the invention has a visual indicator part 21 further comprising a bendable tab 27 with a slotted opening 29 extending from the proximal end, the bendable tab 27 bent over, as seen in FIG. 2, to align the slotted opening 27 with a pre-drilled threaded opening 43 in an outer end 42 of the S cam shaft and a threaded fastener 45 screwed into the pre-drilled threaded opening through the slotted opening so that the visual indicator part is secured to the S cam shaft to prevent motion therebetween and the cover part 22 further comprises a rigid bracket 28 having a slotted bracket opening 30 extending from a distal end of the cover part, the cover part secured to the slack adjuster 40 by a threaded fastener 46 through the bracket opening into an existing opening 44 in the slack adjuster to prevent motion therebetween, as shown in FIG. 2.

Figure 4:
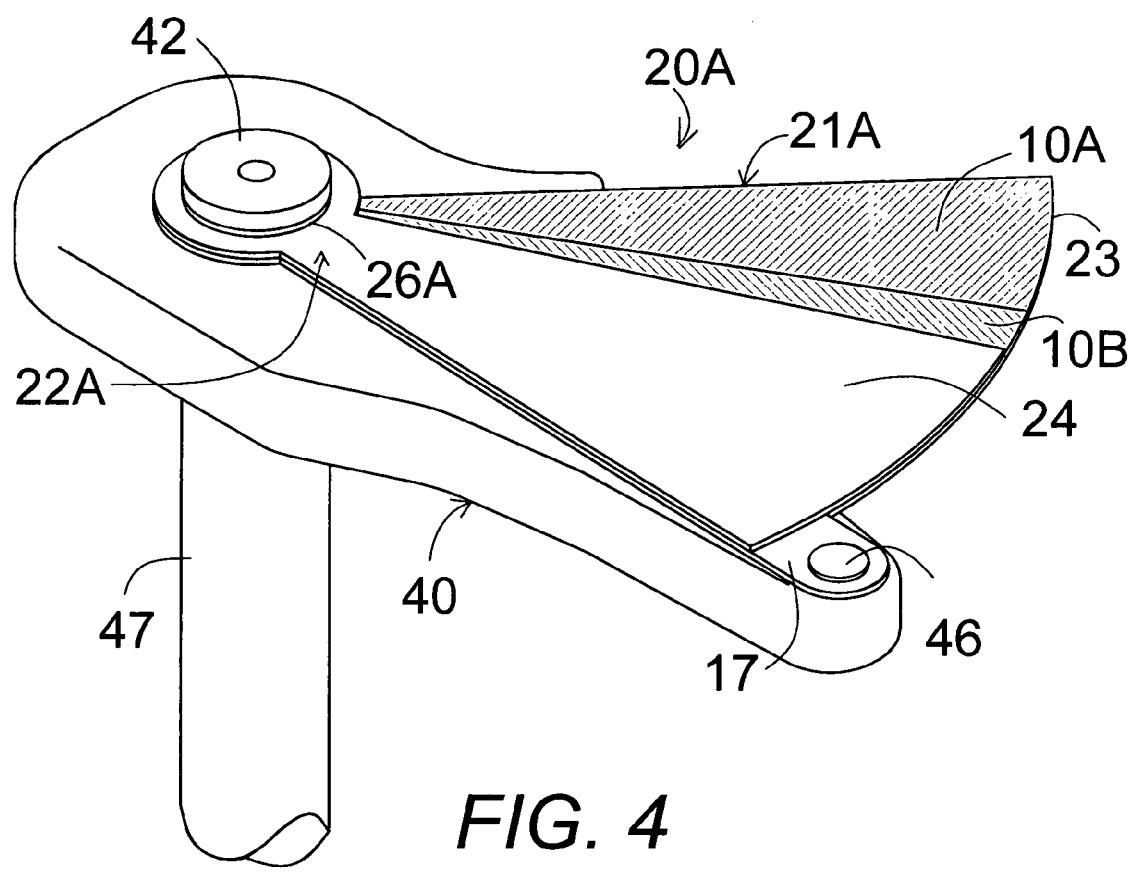
FIG. 4 is a perspective view of the alternate embodiment of the invention of FIG. 3 showing the visual indicator part and the cover part attached to a slack adjuster and S cam shaft of a truck brake.

Alternately in FIGS. 3 and 4, the visual indicator part 21A further comprises a bottom indicator part rigid bracket 17 with an indicator bracket opening 18 therethrough extending from the distal end, the visual indicator part secured to the slack adjuster 40 by a threaded fastener 46 through the indicator bracket opening 18 into an existing opening 44 in the slack adjuster to prevent motion therebetween, and the circular opening 26A of the cover part further comprises a internal annular gear ring 50 mating with an existing external annular gear ring 51 around the S cam shaft 47 so that the cover part is secured to the S cam shaft by the mating gear rings to prevent motion therebetween.

In FIGS. 1 and 2, the cover part 22 is provided with three notches 19A, 19B, and 19C for aligning the intersection of the green color portion 10A and red color portion 10C within one of the notches based on the type of brake and size of the original brake lining, as seen in notch 19C, for proper adjustment of the cover part 22 and visual indicator part 21.

In FIG. 2, with the preferred embodiment, initially the green color portion 10A of the visual indicator part 21 appears on one side of the cover part 22 and as the brake lining gradually wears the green color portion 10A diminishes in size as the brake lining is worn away until the yellow color portion 10B (dashed lines) appears on the other side of the cover part 22 to indicate a low brake lining condition. Eventually the red color portion 10C will appear if the brake linings are not changed.

In FIG. 4, with the alternate embodiment, initially the green color portion 10A of the visual indicator part 21A appears on one side of the cover part 22, and as the brake lining is worn away, the yellow color portion 10B appears on the same side as a warning to change the brake lining. Eventually, if the brake lining is not changed, the red color portion 10C will appear on the same side indicating a dangerous brake lining condition.

To prevent rust and corrosion and to minimize the weight to have minimal effect on the brake slack adjuster operation, the two parts are preferably fabricated of high quality aluminum with a stainless steel thread cutting screw and washers and the color portions are strong adhesive highly reflective colored tape to be easily visible in daylight or with a flashlight shined on them at night.

In practice, the green color portion 10A represents the total brake thickness in degrees, the yellow color portion 10B represents the degrees of brake lining that are in the warning zone before metal to metal contact is reached, and the red color portion 10C represents a very high possibility of metal to metal contact.

The key in using the present invention is to check and replace the brakes when the bright yellow color starts to show and not wait until the red zone appears indicating worn out brakes with very possible metal to metal contact. Once the bright yellow starts to show there is approximately ⅛ inch of good lining before reaching the maximum wear allowed. This gives the driver sufficient time to schedule the vehicle for service without the danger of driving with worn out brakes.

It is understood that the preceding description is given merely by way of illustration and not in limitation of the invention and that various modifications may be made thereto without departing from the spirit of the invention as claimed.

What is claimed is:

1. A two-part color-coded brake condition visual indicator device for trucks, the device comprising:
   a visual indicator part comprising a flat tab having a multicolored visual indicator surface on a side of a distal end of the flat tab, the multicolored visual indicator surface having a least two different colors, and an indicator part circular opening in a proximal end of the flat tab for encircling an S cam shaft of a truck having a brake slack adjuster and an S cam shaft rotatably attached to the brake adjuster on each wheel of the truck; and
   a cover part comprising a mating flat tab having a distal end of the mating flat tab for covering at least a portion of the multi-colored visual indicator surface of the visual indicator part and a cover part circular opening in a proximal end of the flat tab for encircling the S cam shaft, the cover part overlying the visual indicator part to conceal at least a portion of the multicolored visual indicator surface of the visual indicator part; one of the two parts additionally attachable by a rigid attaching element to the slack adjuster and the other of the two parts additionally attachable by a rigid attaching means to the S cam shaft, so that as the slack adjuster and the S cam shaft go through relative movement in adjusting for the thickness reduction of a brake lining due to wear, the cover part and the visual indicator part move relative to each other to reveal at least a portion of the multicolored visual indicator surface showing a current wear level of the brake lining so that a first color indicates a safe thickness of the brake lining and a second color indicates a warning for an unsafe thickness of the brake lining.

2. The device of claim 1 wherein the visual indicator part flat tab and the cover part mating flat tab comprise flat pie shaped elements.

3. The device of claim 1 wherein the multicolored visual indicator surface comprising a green color portion indicating a safe brake liner indicator surface, the green color portion proportional in size to the brake lining, a yellow color portion brake liner indicator surface to warn of thin break linings, and a red color portion indicating danger brake liner indicator surface warning of possible metal on metal with no brake lining.

4. The device of claim 1 wherein the visual indicator part further comprises a bendable tab with a slotted opening extending from the proximal end, the bendable tab bent over to align the slotted opening with a pre-drilled threaded opening in an outer end of the S cam shaft and a threaded fastener screwed into the pre-drilled threaded opening through the slotted opening so that the visual indicator part is secured to the S cam shaft to prevent motion therebetween and the cover part further comprises a rigid bracket having a bracket opening extending from a distal end of the cover part, the cover part secured to the slack adjuster by a threaded fastener through the bracket opening into an existing opening in the slack adjuster to prevent motion therebetween.

5. The device of claim 1 wherein the visual indicator part further comprises a bottom indicator part rigid bracket with an indicator bracket opening therethrough extending from the distal end, the visual indicator part secured to the slack adjuster by a threaded fastener through the indicator bracket opening into an existing opening in the slack adjuster to prevent motion therebetween, and the circular opening of the cover part further comprises a internal annular gear ring mating with an existing external annular gear ring around the S cam shaft so that the cover part is secured to the S cam shaft by the mating gear rings to prevent motion therebetween.

6. The device of claim 1 wherein the two parts are fabricated of corrosion resistant light weight aluminum.

7. The device of claim 1 wherein the multicolored visual indicator surface is formed by strong bonding adhesive highly reflective colored tapes adhered to the visual indicator part to be easily visible in daylight or with a flashlight shined on them at night.

* * * * *